Feb. 24, 1931.  S. G. BLUMENSAADT ET AL  1,794,274
SOCKET CAP CORD CONNECTION
Filed Aug. 24, 1927

Inventors:
Svend G. Blumensaadt
and Frank C. Castelli
by their Attorneys
Howson & Howson Patented Feb. 24, 1931

1,794,274

UNITED STATES PATENT OFFICE

SVEND G. BLUMENSAADT AND FRANK C. CASTELLI, OF PHILADELPHIA, PENNSYLVANIA, ASSIGNORS, BY MESNE ASSIGNMENTS, TO THE ARROW-HART & HEGEMAN ELECTRIC COMPANY, OF HARTFORD, CONNECTICUT, A CORPORATION OF CONNECTICUT

SOCKET-CAP CORD CONNECTION

Application filed August 24, 1927. Serial No. 215,206.

This application is a companion to one filed by Henry T. Paiste on July 12, 1927, for improvements in socket cap cord connections, Serial No. 205,098 which has issued as Patent No. 1,703,046.

The object of the present invention is to provide a simple and effective mechanism for retaining the cord in the cap, the mechanism being actuated by one or more screws.

10 is the body portion of non-conducting material, having a central opening 11 which is enlarged at its lower end as at 12 to allow for the movement of the clamping means.

Figure 1:
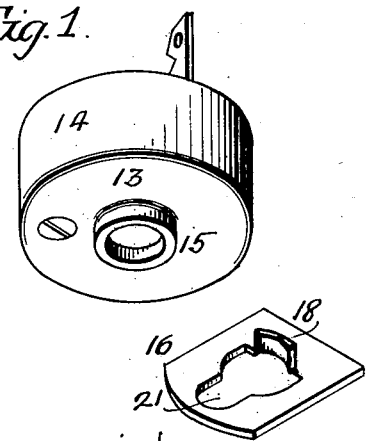
Fig. 1 is a perspective view of the socket cap cord connection.
Figure 4:
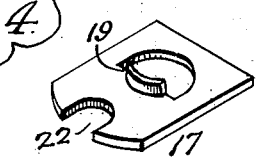
Fig. 4 is a detached perspective view of the clamping members.
Figure 6:
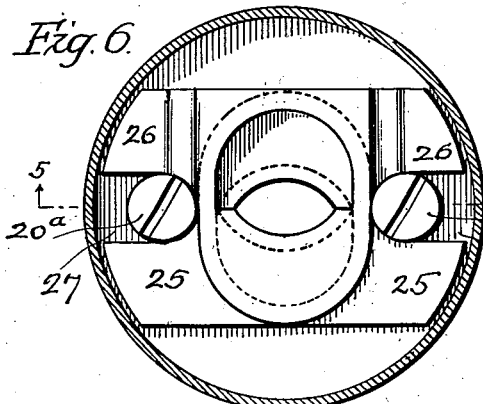
Fig. 6 is an inverted plan sectional view on the line 6—6, Fig. 5.

13 is a cap having a deep flange 14 which extends over the body portion, and has a flanged central opening 15 through which passes a cord a. Between the cap and the body portion are two clamping members 16 and 17 as clearly shown in Fig. 4.

Figure 2:
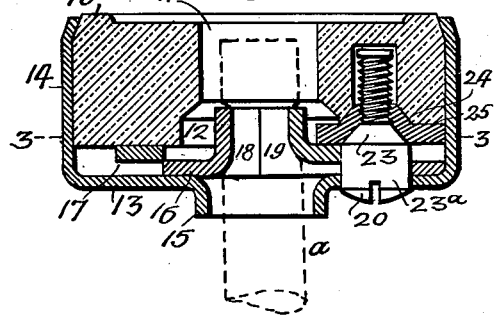
Fig. 2 is a sectional view on the line 2—2, Fig. 3.
Figure 3:
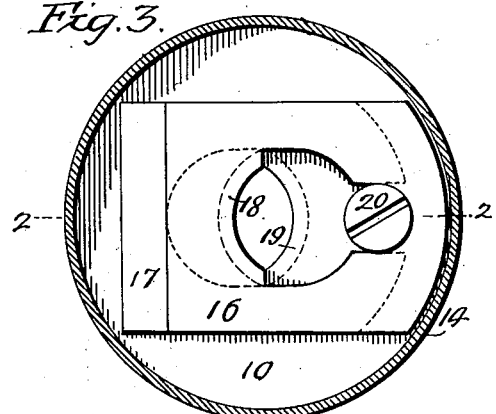
Fig. 3 is an inverted sectional plan view on the line 3—3, Fig. 2.

The clamping member 16 has a segmental flange 18, and the clamping member 17 has a segmental flange 19. These flanges are opposed to each other as shown in Fig. 2 and are arranged to clamp the cord securely when the screw 20 is turned so as to move the two clamping members in opposite directions. The screw passes through a slot 21 in the clamping member 16 and through a slot 22 in the clamping member 17.

The screw has a beveled head 23 which tends to move the two clamping members as it is screwed into the body portion. The screw extends through a nut 24 located in a recess in the body portion, and this nut has a tapered counter sunk opening 25 to receive the beveled portion 23 of the head of the screw 20.

When the screw is backed off, the clamps can be separated and the cord inserted between the clamps. On turning the screw the beveled portion 23 of the head of the screw will move the two clamping members in opposite directions, so that the flanges 18 and 19 will clamp the cord, and when the screw is in position as shown in Fig. 2, it will firmly hold the cord to the socket cap.

Figure 5:
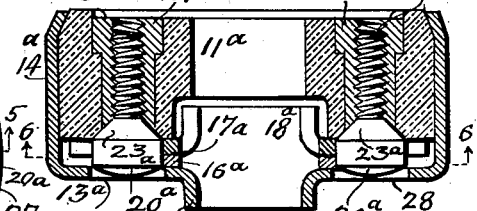
Fig. 5 is a sectional view on the line 5—5, Fig. 6, illustrating a modification of the invention.

In Fig. 5 is shown a modification, in which the body portion 10a has a central opening 11a and openings for shouldered nuts 24a—24a.

The cap 13a has a deep flange 14a, similar to that shown in Fig. 2, and a central flanged opening 15a for the passage of the cord.

Figure 7:
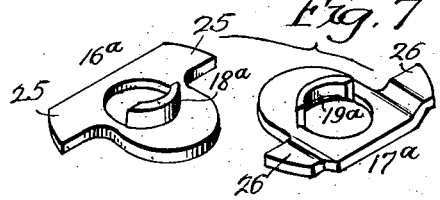
Fig. 7 is a detached perspective view of the clamping members shown in Fig. 6.

The two clamping members 16a and 17a are made as shown in Fig. 7. Each clamping member has a segmental flange 18a and 19a, respectively, and the clamping member 16a has two lateral extensions 25—25 which are opposite the extensions 26—26 on the clamping member 17a. These extensions are so formed as to provide a slot 27, between the two opposed extensions, in which is located the heads of the screws 20a—20a.

The head of each screw is tapered as at 23a, so that when it is desired to clamp a cord, the screws are turned in order that the beveled portions of their heads will move the two clamping members towards the cord and clamp it, and when the screws have been driven to their full extent they will hold the clamping members firmly in position.

In the cap 13a are openings 28—28 through which the screws extend.

In both the constructions shown in Figs. 2 and 5 the casing is used simply as a means for holding the two sliding clamping members in position. The means for actuating the slides is within the casing and is entirely independent of said casing.

To secure a cord in position, all that is necessary is to back-off the screws, so as to allow the clamping members to be separated, insert the cord within the clamps and then turn the screws so that the beveled portions will force the clamping members firmly against the cord, clamping it in position, after which the screws are turned to such a position that the cylindrical portion 23a of each screw head will be in line with the clamping members, rigidly holding the clamping members in the position in which they are adjusted. By backing-off the screws, the clamping members can be withdrawn and the cord removed.

We claim:

1. The combination in a socket cap cord connection, of a body portion; a cap therefor; two clamps located between the cap and the body portion; and a screw having a beveled head extending through the clamps and arranged to move the clamps towards the centre of the connection and thus clamp a cord inserted therein firmly to the socket.

2. The combination in a socket cap cord connection, of a body portion; a cap mounted on the body portion having a central opening therein; two sliding clamping members, each member having a segmental flange, said members being slotted; a screw mounted in the slots; a nut with which the screw engages, said screw having a cylindrical portion adapted to retain the clamping members in position after adjustment.

SVEND G. BLUMENSAADT.
FRANK C. CASTELLI.